Aug. 29, 1933.  F. PUENING  1,924,198
APPARATUS FOR AND METHOD OF PRODUCING COKE
Filed Aug. 10, 1927   10 Sheets-Sheet 1

INVENTOR
Franz Puening.
BY
Jesse R. Langley
ATTORNEY

Aug. 29, 1933. F. PUENING 1,924,198
APPARATUS FOR AND METHOD OF PRODUCING COKE
Filed Aug. 10, 1927 10 Sheets-Sheet 3

INVENTOR.
Franz Puening.
BY Jesse R. Langley
ATTORNEY

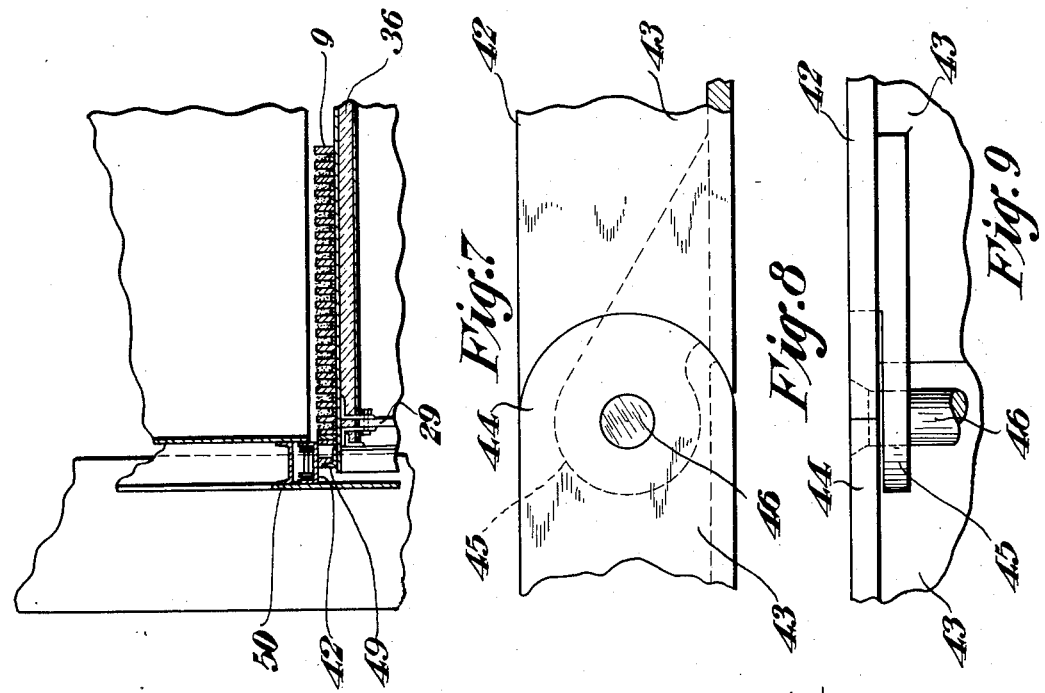

Aug. 29, 1933.  F. PUENING  1,924,198
APPARATUS FOR AND METHOD OF PRODUCING COKE
Filed Aug. 10, 1927   10 Sheets-Sheet 5

INVENTOR.
Franz Puening.
BY Jesse R. Langley
ATTORNEY

Aug. 29, 1933.　　　　F. PUENING　　　　1,924,198
APPARATUS FOR AND METHOD OF PRODUCING COKE
Filed Aug. 10, 1927　　10 Sheets-Sheet 6

INVENTOR.
Franz Puening.
BY Jesse R. Langley
ATTORNEY

Aug. 29, 1933.   F. PUENING   1,924,198
APPARATUS FOR AND METHOD OF PRODUCING COKE
Filed Aug. 10, 1927   10 Sheets-Sheet 7

INVENTOR.
Franz Puening.
BY Jesse R. Langley
ATTORNEY.

Aug. 29, 1933.　　　　F. PUENING　　　　1,924,198
APPARATUS FOR AND METHOD OF PRODUCING COKE
Filed Aug. 10, 1927　　10 Sheets-Sheet 8

INVENTOR.
Franz Puening.
BY Jesse R. Langley
ATTORNEY

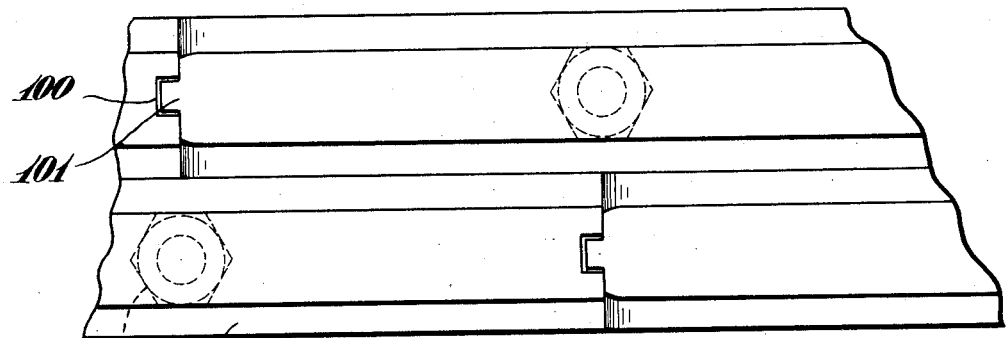
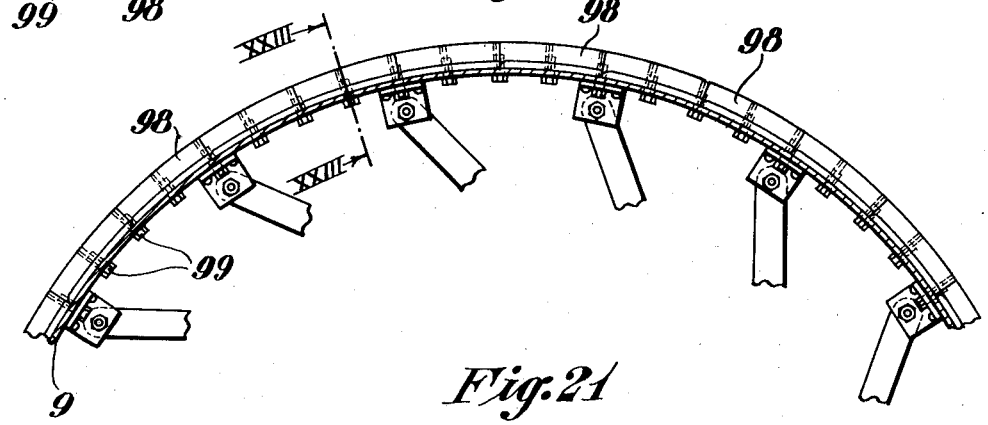
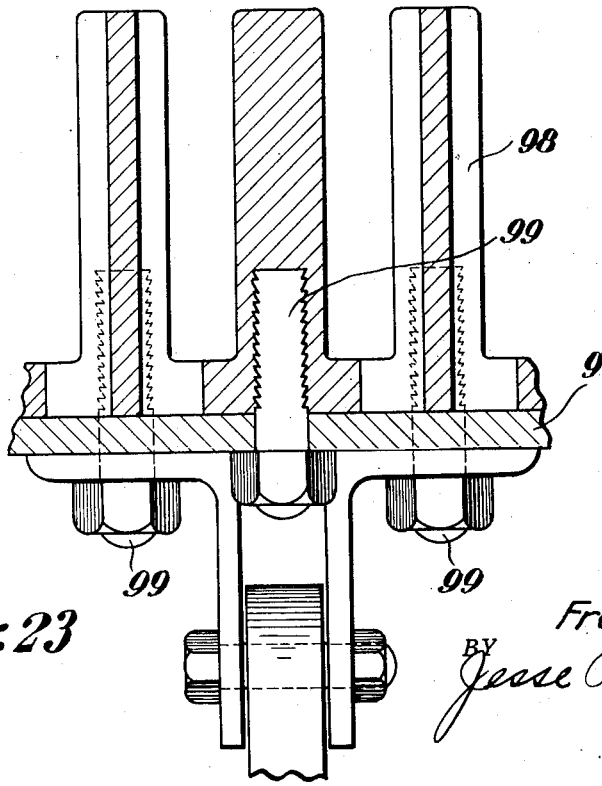

Patented Aug. 29, 1933

1,924,198

UNITED STATES PATENT OFFICE 1,924,198

APPARATUS FOR AND METHOD OF PRODUCING COKE

Franz Puening, O'Hara Township, Allegheny County, Pa.

Application August 10, 1927. Serial No. 211,887

7 Claims. (Cl. 202—9)

My invention relates to coking apparatus and it has particular relation to apparatus that may be employed for the low-temperature distillation of coal, shale and other carbonaceous materials. The present invention is in part an improvement upon the low-temperature coking machine shown and described in my Patent No. 1,698,349, filed February 23, 1923, in which coal is carbonized in thin layers by heat previously stored in adjacent members.

An object of my invention is to provide simple and efficient apparatus of improved characteristics in which the low-temperature distillation of coal or other carbonaceous materials may be performed in a continuous process and at such rate that it may be operated economically and on a commercial scale.

A further object of my invention is to provide a coking apparatus embodying a movable device that is so constructed and arranged as to withstand the stresses occasioned by temperature variations and that is composed of parts that are simple and rugged and that may be conveniently assembled.

Another object of my invention is to provide apparatus of the character described above that shall embody effective means for retaining material to be treated on inclined and moving surfaces.

Another object of my invention is to provide improved apparatus of the type having movable parts within which heat is stored during a portion of its path of travel and material is treated by the stored heat during another portion of its path of travel.

A further object of my invention is to provide coking apparatus having movable parts in which the material to be treated is more effectively sealed from the atmosphere and from gases of combustion whereby the gases of distillation are neither wasted nor contaminated.

A further object of my invention is to provide a simple and convenient unitary arrangement whereby carbonaceous material may be treated to recover the by-products therefrom, the hot carbonized product employed as a fuel, and a portion of the heat thus generated be utilized in the treatment of additional material.

A still further object of my invention is to so operatively combine low-temperature coking apparatus with an ordinary steam boiler or other industrial furnace that the coal which would usually be burned under the boiler may be first carbonized and the hot residue then supplied directly to the grates of the boiler for fuel and the coking apparatus may be heated directly by the furnace to which fuel is supplied.

Many attempts have been made heretofore to produce low-temperature coke on a commercial scale but substantially all of such attempts have been unsuccessful either because the apparatus has been impractical, the investment has been unduly heavy, or the process has been too expensive.

Another serious defect of much prior art apparatus has been the inability of such devices to store or apply sufficient heat to accomplish low-temperature coking of the material therein within a reasonable time. If the apparatus were movable, either the path of movement required was too long or the rate of movement was so slow that the output was very small.

In case combustion gases were used as heating means, it has been difficult to apply the heat to the coal and it has been extremely difficult to maintain a proper degree of separation between the combustion gases and the gases of distillation.

It has long been the aim of economists and engineers to make practicable the recovery of by-products from coal for boilers or furnaces and the supplying of the carbonized residue only for such fuel purposes. The difficulty has been that the charges for underfiring, labor and interest on investment have been so high that the cost of the carbonized fuel was greater than that of coal. It will be appreciated that the cost of the treated fuel must not be greater than that of coal and the charges for the various items noted above must be kept to a minimum. The present apparatus has been designed for the purpose of fulfilling the conditions necessary for the economical operation of a plant for producing and utilizing carbonized fuel.

In accordance with my present invention, I provide relatively simple and improved means whereby low-temperature coke may be produced continuously. Heat furnished by gases of combustion is stored in a relatively short time in a movable device of ample capacity and in such quantity as to efficiently coke coal during a portion only of the path of movement of the device. The temperature of the movable device is suitably regulated in order that the products may be uniform and have the desirable properties resulting from low-temperature coking.

The coking device is so constructed and arranged that the coal to be treated is always in bodies of small depth from the surfaces of the heat-storage device, whereby coking may be completed within a relatively short period. The coal is supplied continuously, is retained on the outer surface of the hollow horizontal cylindrical shell constituting the heat-storage device, and the solid product is removed at the end of the coking zone. The gaseous products are collected.

A constantly changing portion of the shell is passing through the heating zone to store heat while another portion is yielding its stored heat to effect low-temperature distillation.

Effective sealing means are provided between the stationary and movable parts of the installation whereby the distillates are retained and their mixture either with air or gases of combustion is prevented.

The coking apparatus has been combined in a compact unitary arrangement with a boiler and a stoker whereby the hot carbonized residue is supplied directly to the grate of the stoker as fuel for the boiler. The coking apparatus is heated directly by the burning of this fuel, the portion of the path of the coking apparatus through the furnace of the boiler constituting the heating zone for the coking machine. The direct connections between the coal supply, the coking machine, the stoker and the boiler result in great saving of labor and high heat economy.

The foregoing and other objects of my invention and advantageous features thereof will appear in the description of the details of construction and operation of my invention in connection with the accompanying drawings, in which Figure 1 is an end view, partially in section and partially in elevation, of a plant embodying coking apparatus of my invention;

Fig. 5 is a sectional view, taken on line V—V of Fig. 1 of a portion of the apparatus therein;

Fig. 6 is a fragmentary sectional view taken on line VI—VI of Fig. 5, illustrating the details of connection between a portion of the outer surface of the hollow cylindrical device and adjacent stationary structure;

Fig. 7 is a vertical sectional view, taken on line VII—VII of Fig. 6;

Fig. 8 is an enlarged view of a portion of the sealing device shown in Fig. 6;

Fig. 9 is a similar view of the structure of Fig. 8, taken at right angles thereto;

Fig. 21 is a view, similar to Fig. 18, of a further modification;

Fig. 22 is an enlarged fragmentary view illustrating certain of the details of construction of the apparatus of Fig. 21; and Fig. 23 is an enlarged view in transverse section taken on line XXIII—XXIII of Fig. 21.

Figure 1:
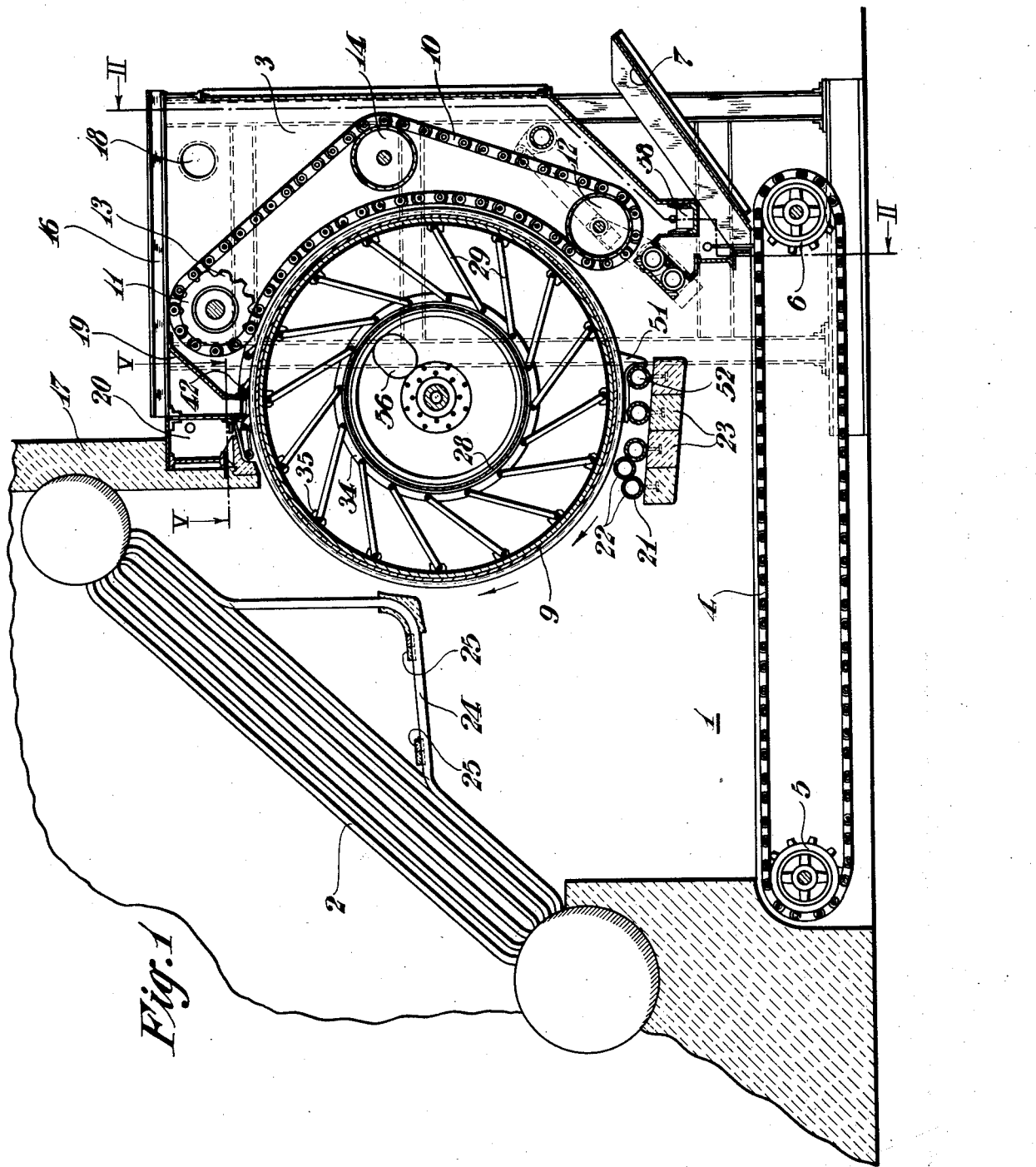
Figure 2:
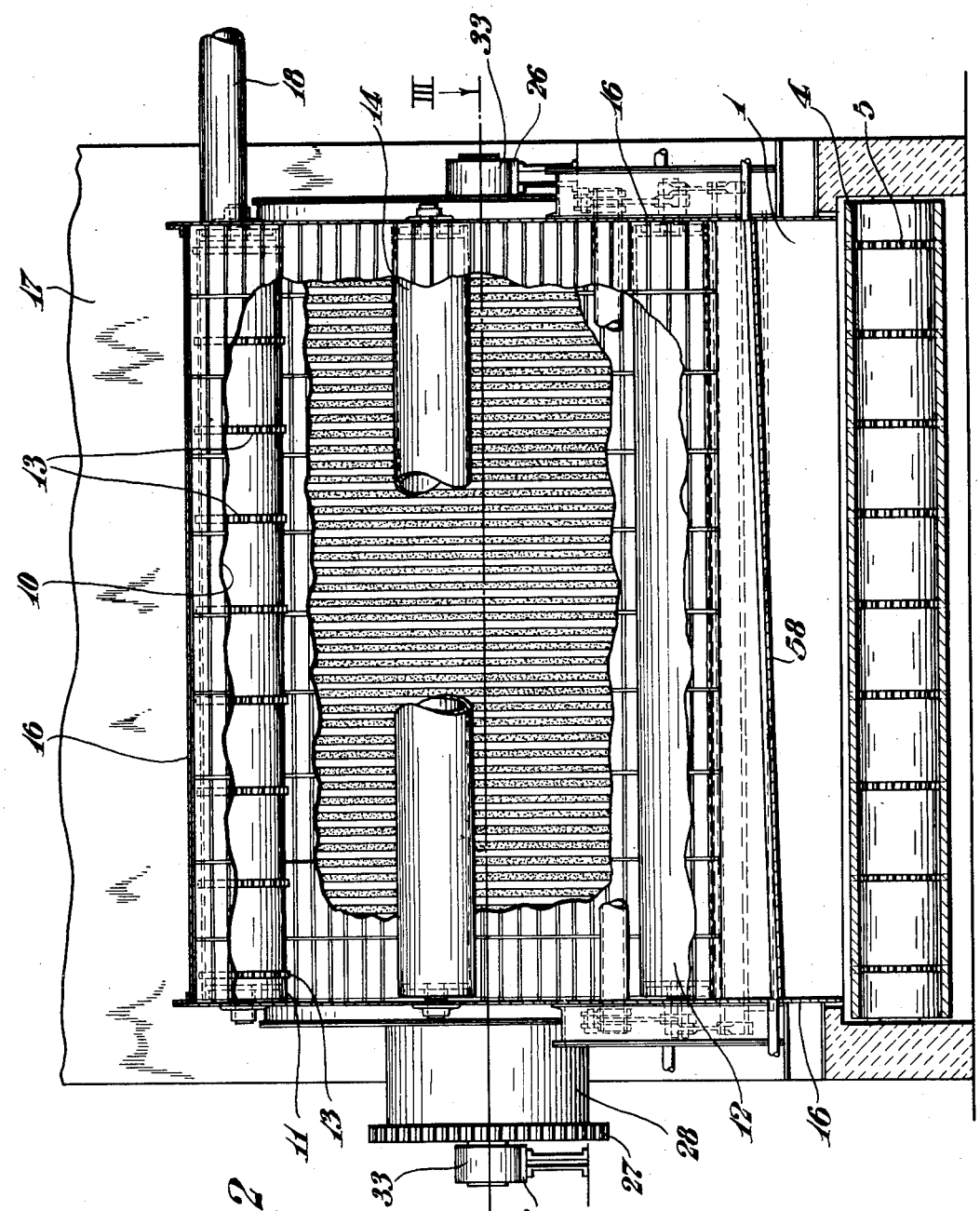
Fig. 2 is a vertical sectional view, taken on line II—II of Fig. 1, parts being broken away.

Referring particularly to Figs. 1 and 2, a furnace 1 is adapted to supply heat to a heat-consuming device such, for example, as a boiler 2 and to a low-temperature coking or distilling device 3, which, in turn supplies carbonized fuel to the furnace 1, as will be hereinafter described.

The furnace 1, which may be of any usual type, comprises an endless chain grate 4, upon which fuel may be fed directly from the low-temperature coking device 3 and which is mounted upon power-driven sprocket wheels 5 and 6. A trough or hopper 7 permits the supplying of fuel from an additional source in starting or in case of emergency.

The boiler 2, which is illustrated, by way of example, as of the water-tube type, is mounted above the furnace 1 and adjacent to the coking device 3. It is adapted to be heated by the gases of combustion from the burning fuel on the grate 4.

The coking device 3 comprises a horizontal hollow cylindrical shell 9 of metal that is mounted for rotation about its horizontal axis and has associated therewith an endless flexible chain 10 that is movable with the shell 9 for a portion of its circular path of movement. The chain 10 is mounted upon suitable rollers 11 and 12 having sprocket wheels 13 and upon an idler roller 14.

A housing 16, which is connected to a furnace wall 17, encloses the portion of the coking device 3 associated with the chain 10, for the purpose of confining the gases of distillation in order that the latter may be collected through an outlet pipe 18. A hopper 19 along the top of the coking device 3 provides means for supplying coal or other material to be carbonized or otherwise treated. A passageway 20 between the hopper 19 and the wall 17 provides means whereby the coal in the hopper may be cooled if necessary, or insulated from the heat of the furnace.

Pipes 21, having spaced perforations 22 and protected from the furnace by refractory blocks 23 are located beneath the coking device 3. The blocks 23 are supported by the pipes 21. They may discharge relatively cool gases along the surface of the shell 9 in variable quantities to suitably regulate the temperature to which the shell 9 is heated by the furnace 1. An additional means for regulating the effect of the furnace and its hot gases is a baffle structure 24 having movable refractory members 25 for directing or controlling the flow of combustion gases relatively to the shell 9 and the boiler 2.

The shell 9, which is mounted on bearings 26, is rotated by any suitable power means (not shown) through a gear 27 that is secured to the projecting end of an inner supporting shell 28.

The shell 28 is connected to the outer shell 9 by non-radial spokes 29 whereby relative expansion and contraction of the several connected parts may occur without undue strains thereon.

Reference may now be had also to Figs. 3 to 13, inclusive, in which the details of the coking device 3 are illustrated. Two short tubular shafts 31 are each connected to the shell 28 by two spaced disks 32. Each of the shafts 31 has an end ring 33 constituting a part of the corresponding roller bearing 26.

The spokes 29 are bolted at their inner ends to rings 34 surrounding the shell 28 and at their outer ends to angle members 35 welded or otherwise secured to the shell 9. This arrangement permits slight pivotal movement of the spokes upon changes in temperature of the structure. The inner surface of the shell 9 has a heat-insulating lining 36.

Figures 11, 12, 13:
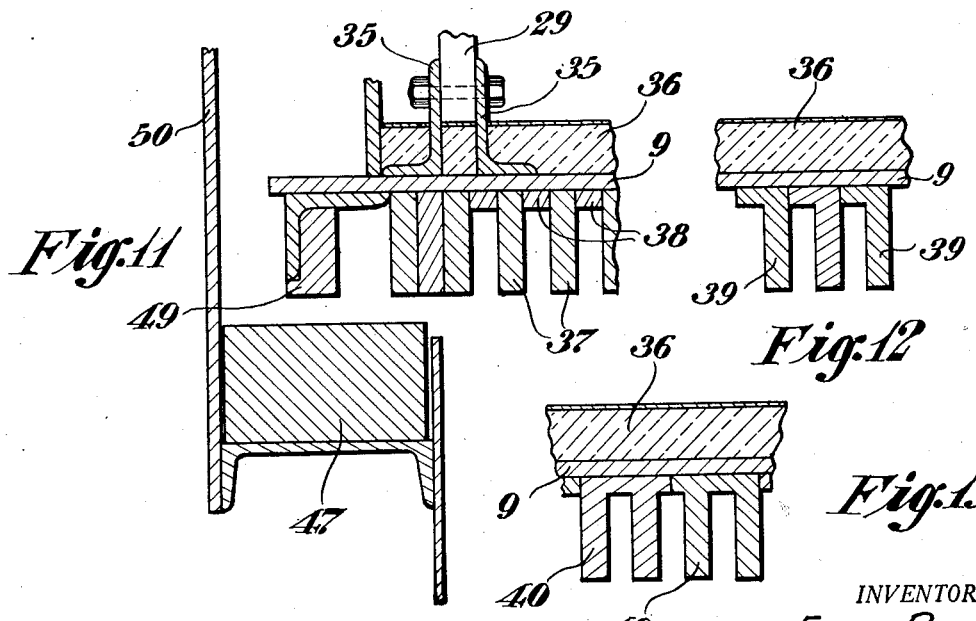
Fig. 11 is an enlarged sectional view of a portion of the apparatus of Fig. 10, taken on line XI—XI thereof.
Figs. 12 and 13 are fragmentary sectional views of modified ring structure.

The outer surface of the shell 9 is provided with a series of metal rings that are slightly spaced to provide relatively narrow coking recesses therebetween. As shown in Fig. 11, annular rings 37 may be separated by spacing rings 38. The rings 37 may be shrunk on the shell 9 or secured in any other suitable manner.

As shown in Figs. 12 and 13, respectively, the rings 39 may be of L-shape or rings 40 may be constructed in pairs, whereby separate spacing rings are not required. In any of the constructions, it is essential that the width of the rings and that of the coking spaces have such relation that sufficient heat may be stored in the rings to coke the coal in the recesses during a cycle of the apparatus.

The junctions between the portion of the edges of the movable coking device 3 within the coking zone and the stationary housing 16 are each sealed by a flexible metal device 42 which fits into a recess in the housing and bears against the rotating surface of the coking device 3. The sealing device 42, portions of enlarged details of which are shown in Figs. 8 and 9, comprises a series of members or links 43 having overlapping portions 44 and 45 that are pivotally connected by pins 46. The sealing devices are anchored at their upper ends to the stationary housing 16 and at their respective lower ends to a block 47. A spring-pressed plunger 48 holds the lower portion of the sealing device inwardly against the flange 49 on the coking device 3 upon which the upper portion of the sealing device rests. The device 42 also bears against an adjacent side wall 50 of the housing 16 to substantially prevent passage of gases between the flange 49 and the wall 50.

Scrapers 51, which are provided for the several coking recesses, are supported upon cooling pipes 52, which also support refractory blocks 23. The scrapers insure the removal of any coke that does not fall by gravity from the recesses.

Figure 3:
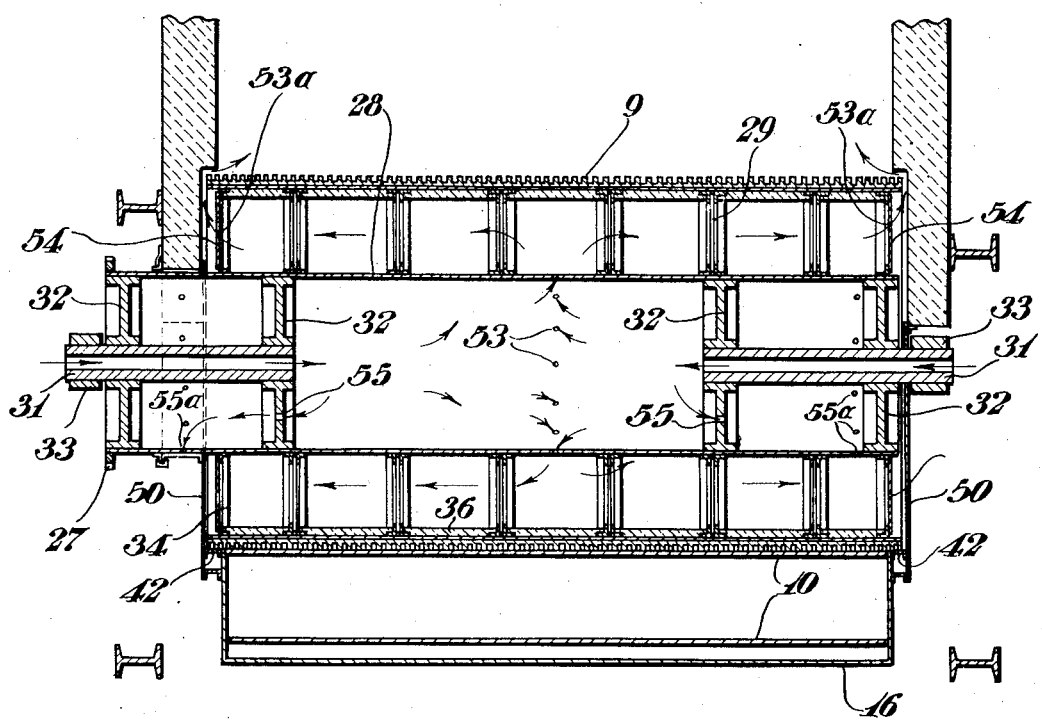
Fig. 3 is a view in longitudinal section on line III—III of Fig. 2 of the hollow cylindrical device of Figs. 1 and 2 and certain of the associated apparatus.
Figure 4:
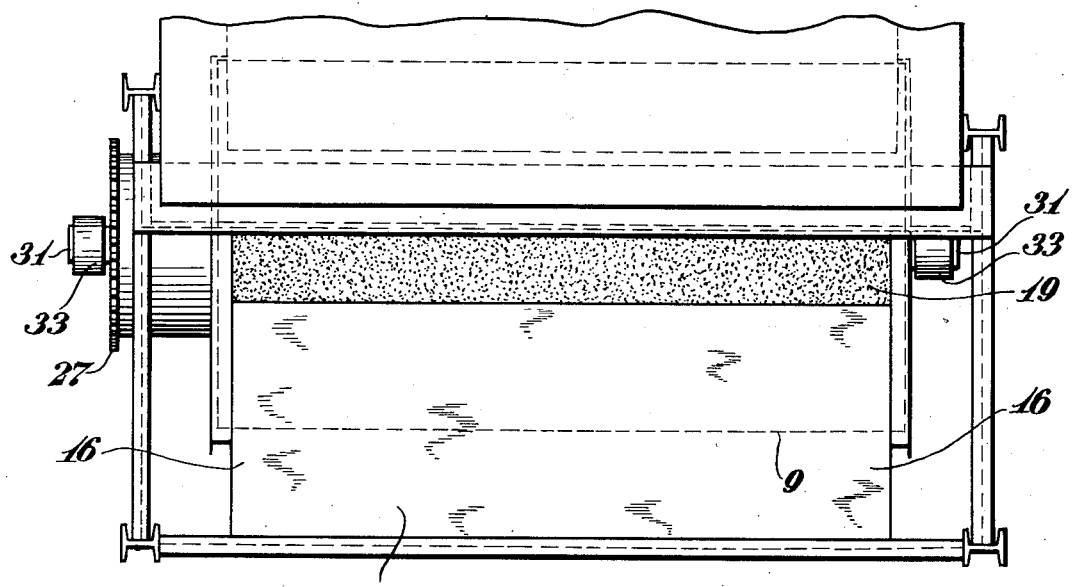
Fig. 4 is a top plan view of the structure of Fig. 3.
Figure 10:
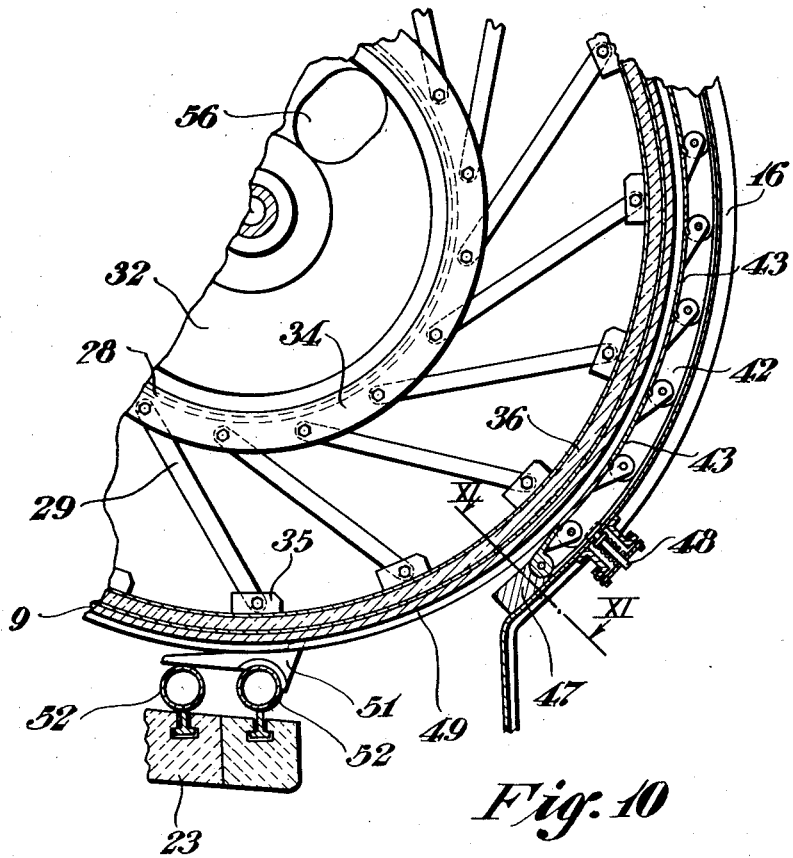
Fig. 10 is a transverse sectional view of a portion of the hollow cylindrical device of Fig. 1 and certain of its associated structure.

Cooling gases may be circulated through the coking device 3, as shown in Fig. 3, entering through the tubular openings in the shafts 31 and passing through perforations 53 in the shell 28, filling the space between the shell 28 and the insulated shell 9, keeping the spokes 29 cool, then escaping through perforations 53a in the end closing plates 54 and around the edges of the shell 9 into the furnace 1 or the housing 16, as shown by arrows.

A certain amount of the cooling medium also pass through perforations 55 and 55a, where it unites with the gases having passed through the perforations 53a. This arrangement prevents air, combustion gases or distillates from entering the interior of the coking device 3 or from mixing with each other by passing through the various crevices in the housing. Manholes 56 in the end of the coking device 3 permit inspection and repair of the interior.

In the operation of the apparatus hereinabove discribed, it may be assumed that the furnace 1 has been provided with fuel which is burning and that the outer structure of the coking device 3 has been heated to such temperature that the heat stored therein is sufficient to carbonize coal. It may be assumed further that the coking device 3 is rotating slowly in a clockwise direction, as viewed in Fig. 1.

Fine or pulverized coal, which is preferably preheated and dried, is supplied to the hopper 19 and it fills the recesses between the heated rings 37 as the shell revolves. As the coal on the surface of the coking device 3 moves downwardly, it is retained in its position between the rings 37 by the flexible chain 10, which moves with the coking device 3. During the downward passage of the coal, it gives off various distillates that are collected within the housing 16 and are withdrawn through the outlet pipe or collecting main 18.

When the coal has passed beyond the chain 10 at the lower portion of the coking device 3, it has been carbonized and will ordinarily fall to the chain grate 4 of the furnace 1. Any coke or carbonized material that fails to fall by force of gravity will, however, be removed by the scrapers 51, which are located at substantially the lowest portion of the path of the rotating cylinder. The fuel thus supplied to the chain grate 4 is burned in the furnace and the heat evolved therefrom is applied to the coking device 3 and to the boiler 2.

While coal is being coked in what may be termed the coking zone within the housing 16, the portion of the coking device 3 that is exposed to the heat of the furnace 1 in what may be termed the heating zone is storing heat for its succeeding passage through the coking zone.

Should the temperature of the outer surface of the coking device 3 tend to exceed that which is desired for low-temperature coking, the rings 37 may be shielded to a degree from the heat of the furnace 1 by forcing a cooling medium which may be, for example, stack gases through the perforations 22 of the pipes 21 in order to insert a layer of cool gases between the hot combustion gases of the furnace and the outer surface of the coking device 3. Also, the movable refractory members 25 may be shifted, as desired, in order to divert more or less of the combustion gases from direct contact with the surface of the coking device.

It will be noted that the process described above is continuous in that coal may be continually supplied to the coking device 3 and fuel for the furnace is supplied thereby at a rate that is greater than necessary to heat the coking device, the excess heat being absorbed by the boiler 2. While the employment of the steam generated in the boiler constitutes no part of the present invention, a portion of it may be utilized in operating the moving parts of the coking device and the furnace while the remainder may be employed for any desired useful work.

A trough 58 that is located at the lower end of the housing 16 is provided for the purpose of collecting tar or similar materials resulting from the distillation of the coal.

There is no likelihood of the distillates being mixed or contaminated with gases of combustion or with air during the coking operation by reason of the several precautions that have been previously described. The cooling medium that is supplied to the interior of the coking device 3 creates a slight pressure therein whereby no other gases may enter and the cooling medium passes around the edges of the coking device 3 into the housing and into the furnace, thereby aiding the mechanical sealing devices that prevent intermingling of gases at the junctions of the stationary housing and the rotatable coking device 3.

Figure 14:
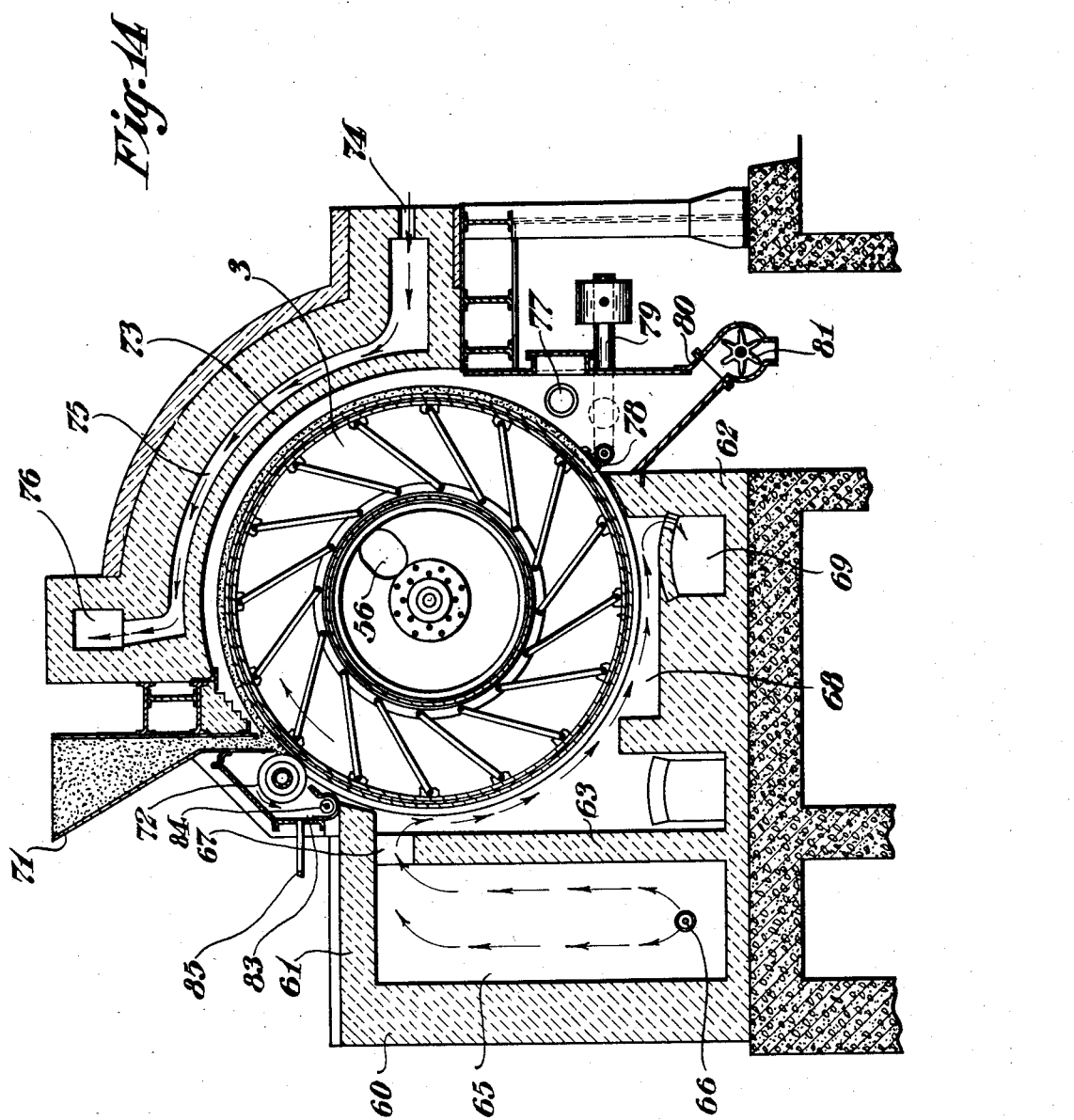
Fig. 14 is a vertical sectional view of coking apparatus that is a modification of the apparatus of Fig. 1.

Reference may now be had to Fig. 14, in which modified low-temperature apparatus is illustrated. The coking device 3 may be similar in all essential respects to that of Fig. 1, but the associated apparatus differs in a number of respects from that shown in Figs. 1 and 2.

The heating zone for the coking device 3 is here shown as constituted by a structure comprising a refractory housing 60, having a top wall 61 and a side wall 62 that terminate closely adjacent to the coking device 3. An inner vertical wall 63 divides the structure into an oblong combustion chamber 65, into which fuel gases are supplied through a burner 66. The gases of combustion pass through openings 67 at the top of the wall 63 and then downwardly adjacent to the outer surface of the coking device 3 in a second compartment or chamber 68 and out through a flue 69. The heating system just described is shown by way of example only as the coking device may be heated as in the apparatus of Figs. 1 and 2. Coal is supplied to the coking device 3 by means of a hopper 71 that is located somewhat below the highest point of the coking device 3. Rollers 72, which extend into the several coking recesses, prevent the coal from sliding downward in the recesses and cause it to be carried upward by the coking device 3, which rotates in a clockwise direction. The rollers 72 may be rotated so that their circumferential speed is equal to that of the coking device or they may be rotated at a higher speed.

An auxiliary heating means is constituted by a refractory structure 73 that is spaced from the coking device 3 and conforms to the periphery of the latter. Hot gases may be supplied through openings 74 and flow upwardly through a passage 75 and out through a flue 76. The auxiliary heating means may be employed only when necessary and it may be used also, as regulating means to supplement the heat of the gases supplied to the heating zone, in case the temperature of the coking device tends to fall below the desired value.

In operation, coal is supplied continuously through the hopper 71 and the rollers 72 cause it to be carried upwardly by the rotating coking device 3. The temperature of the metal rings adjacent to the coking recesses and the width of these recesses is such that the coal becomes plastic before the periphery of the coking device 3 corresponds to the angle of repose of the coal. Coal in its plastic state adheres to the adjacent surfaces and there is no necessity, therefore, for retaining the coal in the recesses during its passage downward along the side of the coking device 3.

The distillates of the coal, during its passage through the coking zone, are drawn off through a collecting main 77 that communicates with a housing which surrounds the portion of the coking device between the auxiliary heating structure 73 and the wall 62. When the cake reaches scrapers 78 that are yieldingly held in position by weighted arms 79, the coke is removed and it drops into a hopper 80, from which it may be removed by an extractor 81.

Any loose or excess coal that may be carried over the roller 72 is collected in a hopper 83 and is withdrawn therefrom by means of a screw-conveyor 84 of the usual type. A cooling medium may be supplied through the pipe 85 in order to prevent the rollers 72 and the conveyor 84 together with the coal spillage from becoming overheated. This cooling medium will then pass into the heating chamber and escape with the waste gases through flue 69.

Figure 15:
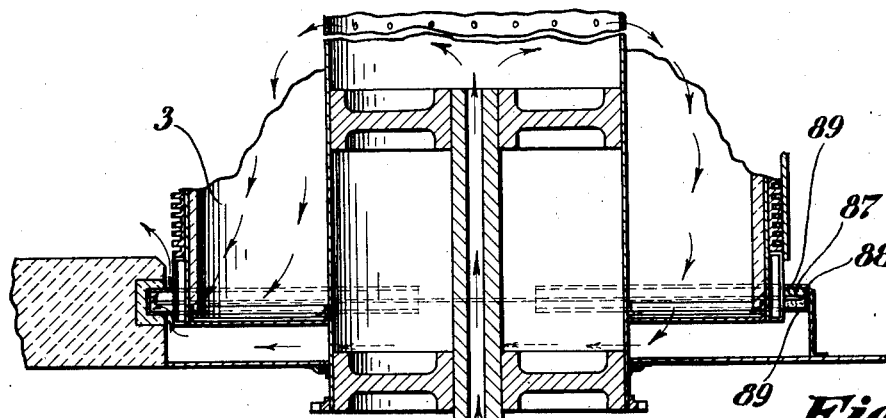
Fig. 15 is a fragmentary view, in longitudinal section, taken on line XV—XV of Fig. 16, illustrating the structure whereby a cooling medium may be circulated through the cylindrical device.
Figure 16:
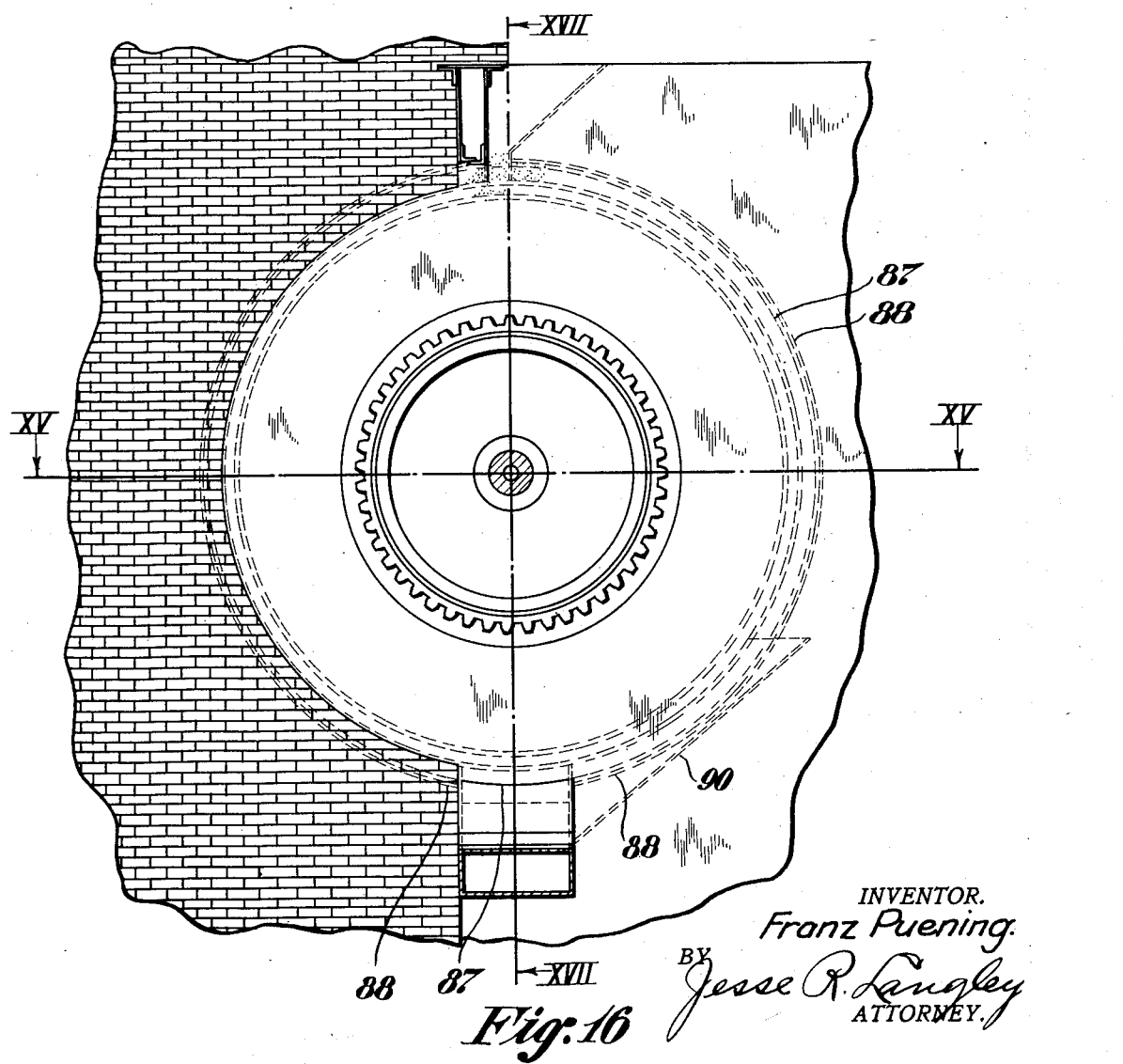
Fig. 16 is a view, partially in end elevation and partially in section along the line XVI—XVI of Fig. 17.
Figure 17:
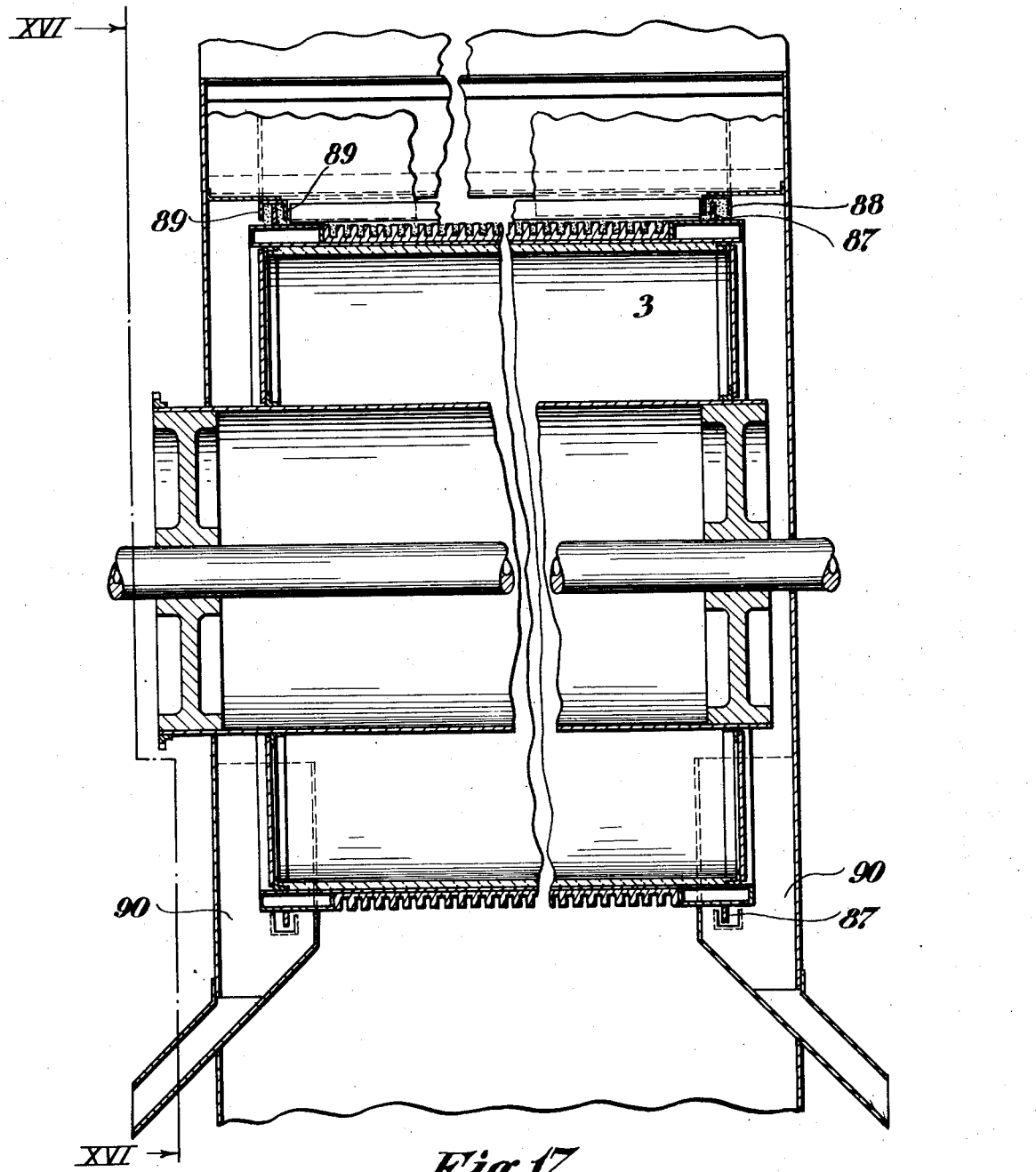
Fig. 17 is a vertical sectional view, taken on line XVII—XVII of Fig. 16, parts being broken away.

Reference may now be had to Figs. 15, 16 and 17, in which additional modified structure is illustrated. The structural details of the coking device 3 may be, in general, similar to those of the coking device of Figs. 1 and 2, except that a modified sealing means is employed. Instead of using a mechanical device that is flexibly mounted to float on the surface of the coking device 3, the latter is provided, at each end, with a circumferential flange 87 that extends into an annular housing 88 having side walls 89 that are slightly spaced from the flange 87. The housing 88 is supplied near its top with coke breeze or coal, which fills the housing 88 on the distilling side of the coking device 3, the flange 87 rotating in the coke breeze. Hoppers 90 are provided beneath the ends of the coking device 3 to collect any coke breeze that may be spilled from the housing 88, and, in addition, the coke breeze which is continuously discharged near the bottom of the housing 88 for return to the source of supply of coke breeze.

As in the structure of the coking device of Figs. 1 and 2, means are provided for circulating a cooling medium in the interior of the coking device and employing the cooling medium as additional means for preventing the mixture or contamination of distillates with combustion gases or air. The cooling medium inside the coking device 3, being under slight pressure, no gases, other than the cooling medium, are permitted therein and the cooling medium must escape into the heating chamber by passing through the housing 88, thereby keeping the flange 87 cool. The construction and operation of the apparatus illustrated in Figs. 15 to 17 does not differ in other essential respects from the apparatus of Figs. 1 and 2.

Figure 18:
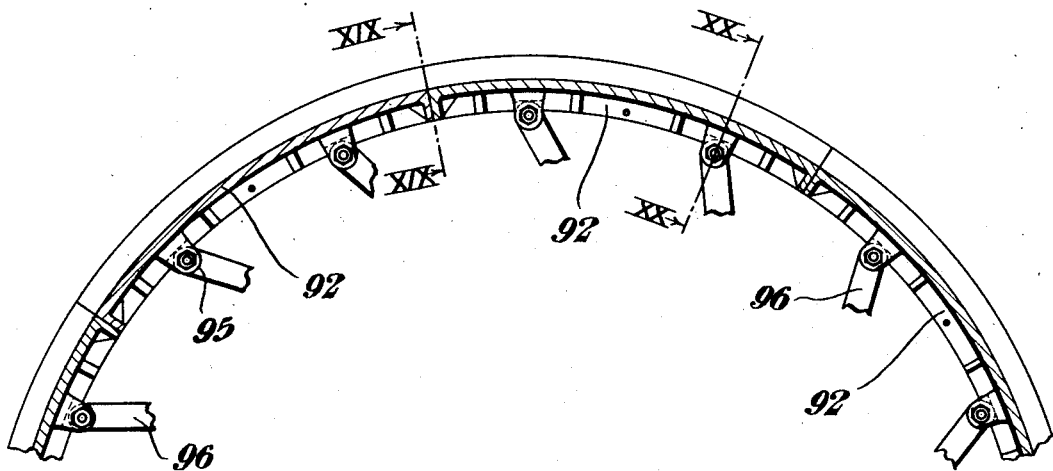
Fig. 18 is a transverse sectional view of a modified outer portion of the hollow rotatable device of Fig. 1.
Figure 19:
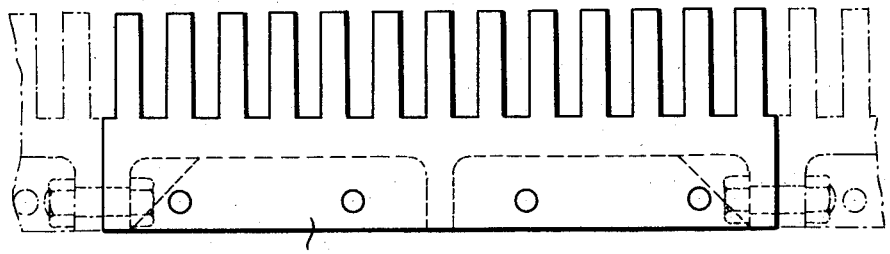
Fig. 19 is an enlarged transverse sectional view on line XIX—XIX of Fig. 18.
Figure 20:
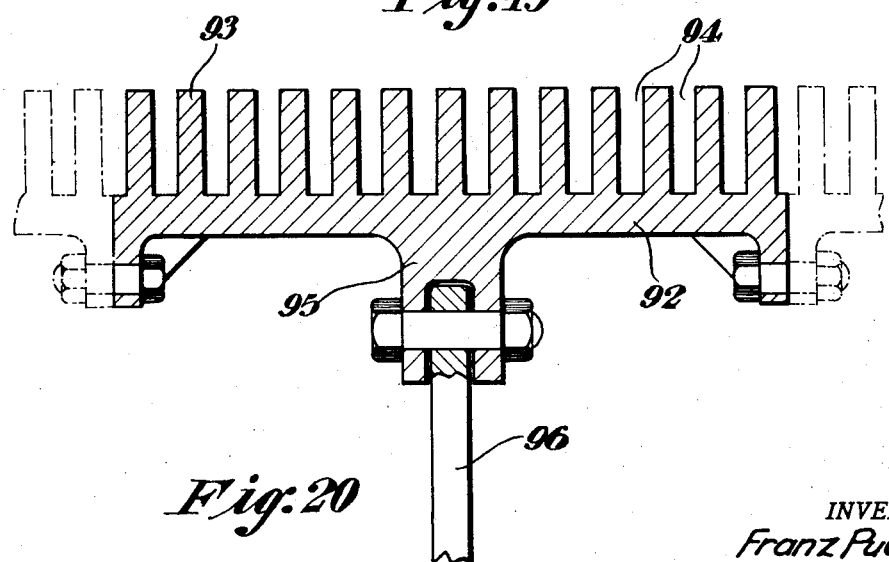
Fig. 20 is a similar view, on line XX—XX of Fig. 18.

Figs. 18, 19 and 20 illustrate modifications of the structural details of the outer cylindrical portion of the coking device 3, instead of employing an integral cylindrical shell and separate rings thereon, as in the apparatus of Figs. 1 and 2. The outer cylinder may be composed of segmental castings 92 which may be bolted together at adjacent edges. The rings 93, which are spaced to provide coking recesses 94, are integral with the segments 92 and the necessity of shrinking or otherwise securing unitary rings on the cylinder is avoided. Internal lugs 95 provide means for securing the spokes 96.

A further modification of the structural details of the coking device 3 is shown in Figs. 21, 22 and 23. The rings for storing heat on the exterior of the cylindrical shell 9 are constituted by segments 98 of substantially T-shape in cross-section that are secured to the shell 9 by radially-extending bolts 99 which are cast into the segments 98. The ends of the adjacent segments are respectively provided with a notch 100 and a projection 101 for retaining the adjacent segments in their proper relative positions. As shown in Fig. 22, the end portion of the segment that is first to be engaged by scrapers or other mechanical devices for removing the coke are beveled or chamfered in order that any slight irregularities in casting or in matching adjacent ends of the rings may not cause the scrapers to engage any blunt projecting surfaces. This arrangement possesses the advantages that the rings may be formed of parts that are relatively easy to manufacture and that may be readily replaced in case of breakage or of necessity for repair. It is obvious, also, that this last form of rib may be made of non-metallic refractory material.

It will be noted from the foregoing that I have provided low-temperature distilling apparatus that is comparatively simple in construction and that may be operated continuously to produce hot low-temperature coke for boilers or other industrial furnaces. The unitary arrangement of the boiler, stoker, coking machine and coal supply is of particular advantage in that no special coal handling or coke conveying machinery is necessary because the materials are supplied directly from one unit of the combination to another. The surfaces of the coking machine are in position to be heated both by radiation and convection from the fire under the boiler, whereby it is unnecessary to provide a special heating arrangement with its combustion chamber, flues and stack.

The length of the coking machine is approximately equal to the width of the stoker whereby the coke is automatically distributed over the latter and no special distributing means is required.

The heat economy of the apparatus is very high since substantially all radiation is between the stoker, coking machine and the boiler and heat losses are, therefore, negligible. The coke is used for fuel without cooling and heat is thus returned to the stoker. There are no stack losses for the coking apparatus.

By reason of the rapid heat transfer to the surfaces of the coking machine and from these surfaces to the thin layers of coal, the coking machine may be relatively small and inexpensive. The rapidity of transfer is brought about by the direct exposure of the machine to the high temperatures of the boiler fire and the storing of heat in the exposed surfaces only from which it is readily given out.

In addition, the layers of coal are very thin and it is not necessary for the heat to penetrate thick layers of coal and coke which are poor conductors. For example, it is known that one square foot of heated surface may carbonize only one pound of coal per hour when the latter is 8 to 10 inches in depth while as much as sixteen pounds may be carbonized per hour if the coal is only one-half inch in depth.

The quality of the coke produced is high for boiler use because it is uniform and of small size suitable for chain grate stokers. The coke retains its form produced by the narrow spaces between the ribs and little dust or coke breeze is formed.

I have provided, also, in apparatus of the character described above, efficient means for preventing the loss of valuable distillates by their escape either into the furnace or into the atmosphere before they are withdrawn through the usual collecting devices. The sealing means for preventing the escape of the distillates operates effectually, also, to prevent the dilution or contamination of the distillates by their mixture with air or combustion gases.

The foregoing and other advantages will be apparent to those skilled in the art relating to low-temperature coking.

The apparatus of my invention may be modified in various ways and it is desired, therefore, not to limit the scope of my invention other than indicated in the appended claims.

I claim as my invention:

1. Distilling apparatus comprising a movable surface having opposite edges adapted to receive material to be heated and stationary means adjacent to the edges of said surface for retaining said material thereon and for preventing exchange of gases between said material and the atmosphere at the edges of the material-bearing surface, said means comprising a flexible device adapted to closely engage each edge of said surface.

2. Distilling apparatus comprising a movable surface having opposite edges adapted to receive material to be heated and stationary means adjacent to the edges of said surface for retaining said material thereon and for preventing exchange of gases between said material and the atmosphere at the edges of the material-bearing surface, said means comprising a series of flexibly connected members for closely engaging each edge of said surface.

3. The combination with a furnace having a combustion chamber, of a movable coking machine having a portion of its outer surface adapted to be exposed to the heat of said combustion chamber and a second portion of its outer surface enclosed, of means for supplying material to said enclosed portion for carbonization and means for removing carbonized material from said machine for delivery to said furnace for fuel therein.

4. Distilling apparatus comprising two concentric horizontal cylindrical shells the inner of which is rotatably supported, means for connecting said shells in spaced relation comprising a plurality of non-radial spokes and secured to said shells to permit relative expansion or contraction of said shells, the outer shell being adapted to store heat therein and adapted also to receive material to be treated on its outer surface, and said outer shell having a heat-insulating lining.

5. Distilling apparatus comprising a hollow cylindrical device having rings extending circumferentially therearound with recesses therebetween, said rings being formed of a plurality of segments, the junctions of segments of adjacent rings being staggered and said segments being individually detachable for replacement or repair.

6. Distilling apparatus comprising a hollow cylindrical device having rings extending circumferentially therearound with recesses therebetween, said rings being formed of a plurality of segments having interlocking means at the junctions thereof, the junctions of segments of adjacent rings being staggered, said segments being individually detachable from said device and said recesses being adapted to receive material to be treated by the heat stored in adjacent structure including said rings.

7. The method of continuously preparing and supplying carbonized fuel to, and distributing it into, a combustion zone and burning the fuel which comprises rotating a heat-storage solid-medium of substantially the same width as said combustion zone within the same and thereby heating a constantly changing portion of said medium with heat from combustion in the combustion zone, continuously supplying coal to another previously heated portion of said medium carbonizing said coal on said medium by the heat stored in said medium, delivering the carbonized fuel from said medium directly to said combustion zone and across its entire width, and then burning the carbonized fuel in said combustion zone.

FRANZ PUENING.